United States Patent [19]

Smarsly et al.

[11] Patent Number: 5,073,459
[45] Date of Patent: Dec. 17, 1991

[54] SINTERED LIGHT-WEIGHT STRUCTURAL MATERIAL AND METHOD OF ITS MANUFACTURE

[75] Inventors: Wilfried Smarsly, Munich; Wolfgang Track, Alling, both of Fed. Rep. of Germany

[73] Assignee: MTU Motoren- und Turbinen-Union Munchen GmbH, Fed. Rep. of Germany

[21] Appl. No.: 469,781

[22] Filed: Jan. 24, 1990

[30] Foreign Application Priority Data

Jan. 25, 1989 [DE] Fed. Rep. of Germany ....... 3902032

[51] Int. Cl.⁵ .............................................. G22F 3/10
[52] U.S. Cl. ........................................ 428/550; 419/2; 419/54; 419/55; 428/402
[58] Field of Search ............... 419/2, 54, 55; 428/550, 428/402

[56] References Cited

U.S. PATENT DOCUMENTS

| 1,138,792 | 1/1969 | Butts | 75/249 |
| 3,961,909 | 6/1976 | Shapiro | 29/182 |
| 4,775,598 | 10/1988 | Jaeckel | 428/550 |
| 4,832,737 | 5/1989 | Mathy et al. | 75/249 |
| 4,917,857 | 4/1990 | Jaeckel | 419/9 |
| 4,925,740 | 5/1990 | Norris et al. | 428/547 |

FOREIGN PATENT DOCUMENTS

| 0300543 | 7/1988 | European Pat. Off. . |
| 3210770 | 9/1983 | Fed. Rep. of Germany . |
| 3210770 | 12/1984 | Fed. Rep. of Germany . |
| 2006271 | 5/1979 | United Kingdom . |

Primary Examiner—Stephen J. Lechert, Jr.
Attorney, Agent, or Firm—Evenson, Wands, Edwards, Lenahan & McKeown

[57] ABSTRACT

A sintered metallic light-weight structural material consists of spherical voids and lattice-type webs of intermetallic compounds. Owing to its weight-specific strength, which is superior to that of conventional super-alloys, this material is suited especially for application in aircraft and turbine engine construction.

15 Claims, 2 Drawing Sheets

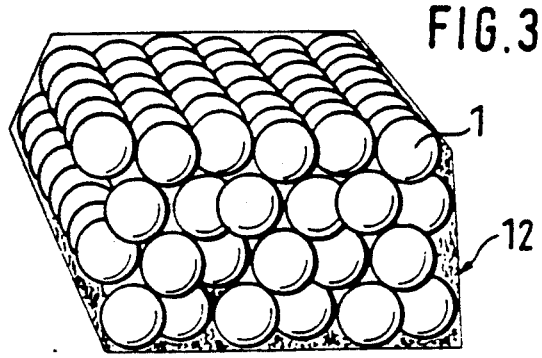
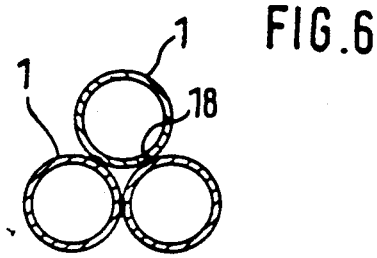
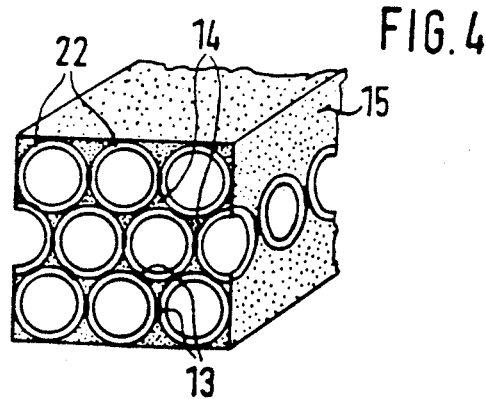
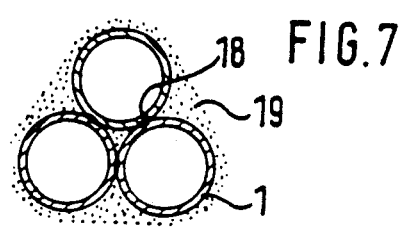
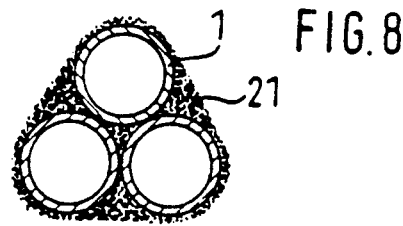
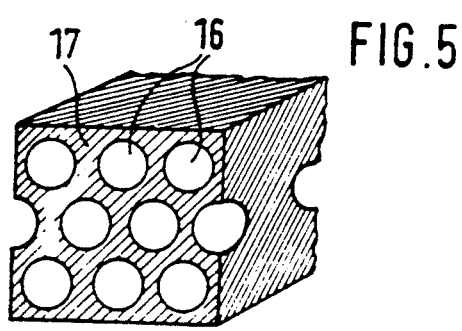
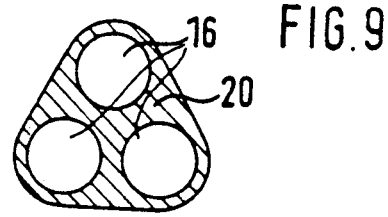

SINTERED LIGHT-WEIGHT STRUCTURAL MATERIAL AND METHOD OF ITS MANUFACTURE

BACKGROUND AND SUMMARY OF THE INVENTION

This invention relates to a sintered metallic light-weight structural material and to a method for manufacturing the material.

Such a material and method have been disclosed by German Patent Specification 32 10 770 C2. A disadvantage of this material is the irregular distribution of the hollow spheres in the sintered body. As a result, local agglomeration of sinter metal on the one hand and hollow spheres on the other cannot safely be prevented and can lead to varying, locally limited, strength values. Another problem is that, in accordance with the teaching of the above noted patent specification, a similar material with a propensity for solid solution is used for filling the voids between the metal spheres.

In a broad aspect of the present invention, a material of the above generic description is Provided, which possesses substantially higher weight-specific strength values than conventional material and exhibits uniform strength properties throughout the structure of the material, as well as a method for manufacturing it.

It is a particular object of the present invention to provide a material essentially consisting of a lattice structure of webs of intermetallic compounds forming uniformly distributed spherical voids which in turn are arranged in a maximally dense sphere packing arrangement.

Advantages of the preferred embodiments of the light-weight construction material of the present invention include that the material exhibits no locally limited varying strength values or weak points, but instead is characterized by great uniformity of strength properties. The material additionally possesses the high strength values of intermetallic compounds and an extremely low component weight, so that in an advantageous aspect of the present invention, its weight-specific strength is higher than that of conventional nickel or cobalt base super-alloys. Another advantage is provided by the high resistance of this sintered light-weight structural material to creep. The sintered light-weight structure material of essentially intermetallic compounds also provides an advantage in its high structural stability at elevated temperatures partially as high as the melting point.

A preferred diametral range for the hollow spheres of the present invention runs from about 0.5 to 5 mm. Such symmetrically arranged voids advantageously permit the specific weight to be reduced and the weight-specific strength to be increased accordingly, especially so since the webs of intermetallic compounds can be arranged so as to reinforce the material in directions of high mechanical load.

In a preferred embodiment of the present invention the webs reach a minimum of about 95% of the theoretical density of the intermetallic phase. This afford an advantage in that the light-weight structural material approximately has the same strength values as a solid component of conventional super-alloys.

In another broad embodiment of the present invention, a method is provided for simply and economically manufacturing the sintered light-weight structural material.

Thus, it is a further particular object of the present invention to provide a method comprising the steps of:
(a) Stacking the metallic hollow spheres to form a maximally dense, sphere packing arrangement,
(b) Presintering the metal spheres to form a presintered material,
(c) Filling the voids in the presintered material with powdered metals, metal alloys or intermetallic compounds adjusted in type and amount to suit the material of the metallic hollow spheres such that in subsequent sintering, intermetallic compounds result in the shape of webs between spherical voids, and
(d) Sintering the presintered material and the powder filling at a temperature permitting the formation of intermetallic compounds to form a sintered metallic light-weight structural material.

This method affords an advantage in that by stacking the metallic hollow spheres to form a maximally dense, sphere packing arrangement, fully uniform distribution of the spherical voids is achieved across the section of the sintered light-weight structural material and in that agglomerates of spherical voids are prevented.

According to advantageous embodiments of the method of the present invention, stacking the spheres in a sintering mold is preferably achieved by giving the sintering form accurately perforated inner walls having regularly spaced recesses governing the position of the spheres in the outer layers of the compact as a function of the outer radius of the hollow spheres and the stacking sequence ABA or ABC. With an ultrasonic device, the filled, sintering mold is agitated so that the spheres are caused to arrange themselves from the outside towards the inside in a maximally dense, sphere packing arrangement, advantageously permitting continuous webs of sinter material to form.

In a preferred embodiment of the present invention, use is made for stacking, of hollow nickel or cobalt spheres of approximately the same ($\pm 10\%$) outer radius, and the spheres are fixed in their relative position by presintering at about 800° C. to 1300° C., so that the regular stacking pattern of the metallic hollow spheres is advantageously preserved in subsequent process steps. By presintering the metallic hollow spheres, a self-supported porous and stable preform is produced which is suitable also as a filler material for cooling-gas wetted components, such as turbine blades, or as a filter material. Depending on the application, use is preferably made of hollow spheres of an outer diameter from 0.401 to 5.3 mm and a shell thicknesses from 10 $\mu$m to 300 $\mu$m. These sizes will benefit the simple and economical processing of the hollow spheres to form a maximally dense sphere packing.

Filling the voids between the hollow spheres of the presintered materials with a powdered metal alloy is advantageously performed in an ultrasonic device, since such devices achieve a high packing density at a minimum of effort and stacking errors.

Preferred metallic powder materials are one or more of the following elements, or alloys or intermetallic compounds thereof: titanium, vanadium, molybdenum, cobalt, chrome, nickel, aluminum or silicon. These powdered materials, with the exception of aluminum and silicon, are high-melting transitional metals advantageously enabling the manufacture of several highly heat resistant light-weight structural materials from intermetallic compounds to cover a wide range of mechanical requirements with the new materials.

Among the group of powdered metal alloys, aluminum in conjunction with nickel has proved its value as a hollow sphere material. With nickel it forms the intermetallic compounds NiAl and NiAl$_3$ and provides an advantage over nickel base alloys in its greater mechanical strength, so that a light-weight structural body has the same strength values as a nickel base super-alloy, despite its intermetallic webs of at least 95% of the theoretical density and its spherical voids.

In a preferred embodiment of the method, the metallic hollow spheres are first sintered and an aluminum alloy powder or a powder from an aluminum-nickel blend is then agitated to fill the hollow spheres between the nickel spheres. For this purpose, the nickel-to-aluminum ratio is selected such that a stochiometric quantitative nickel-to-aluminum proportion referred to total weight is maintained. Sintering at about 1600° C. then produces the highly heat-resistant intermetallic compound nickel-aluminite. This sintered light-weight structural material advantageously possesses higher heat resistance at the elevated operating temperatures commonly associated with a gas turbine than a nickel base alloy.

Regular distribution of the spherical voids produces an advantageously lattice-like, light-weight structural material of load-bearing sintered, highly heat resistant and crosswise interconnected webs that permit the adoption of new design approaches especially in aircraft and turbine engine construction which heretofore were still lacking suitable materials, particularly since this new material advantageously combines high heat resistance with low specific weight and has high ductility that makes it superior to ceramic materials.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates a presintered preform consisting of nickel spheres, FIG. 4 illustrates a presintered structure with filled voids between the hollow spheres, FIG. 5 illustrates a sintered light-weight structural material, and FIGS. 6-9 illustrate an embodiment of a method for manufacturing a light-weight structural material.

DETAILED DESCRIPTION OF THE DRAWINGS

Embodiments of the present invention are illustrated in the accompanying drawings and described below.

Figure 1:
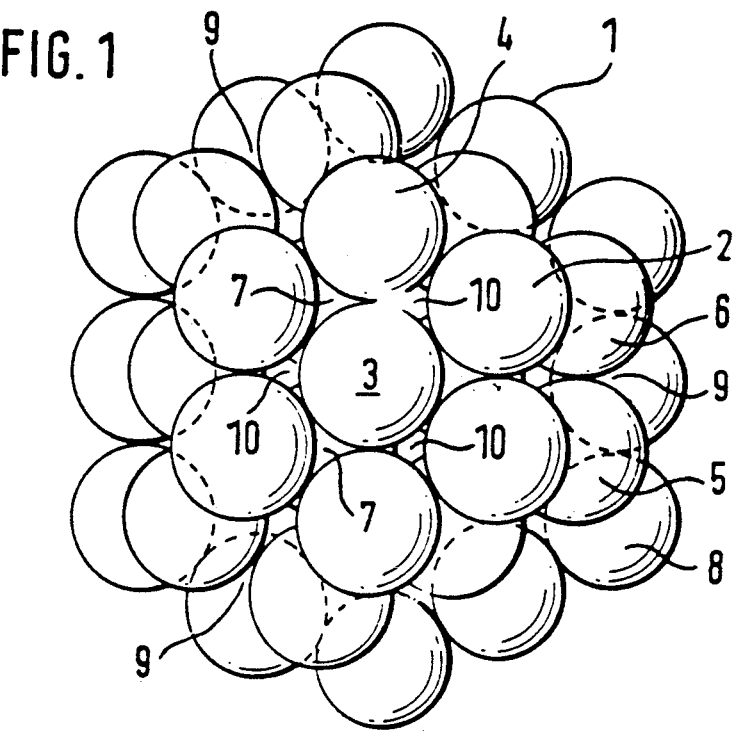
FIG. 1 illustrates a hexagonally maximally dense sphere packing arrangement of metallic hollow spheres.

FIG. 1 shows a top view of a hexagonally maximally dense sphere packing arrangement of metallic hollow spheres 1 using a stacking sequence ABA, wherein an uppermost layer 2 consists of a central hollow sphere 3 encircled by six equally sized hollow spheres 4. A central layer 5, below the uppermost layer 2, fits with its hollow spheres 6 in recesses 7 of the topmost layer 2. For space reasons, however, only every second recess 7 of the topmost layer 2 is occupied by a hollow sphere 6 of the central layer 5.

A bottom-most layer 8 again occupies the same recess positions 9 as the topmost layer 2. Using this stacking sequence for the hollow spheres 1, continuous vertical, mechanically highly loadable web areas 10 can be produced by sintering metal powder in the voids between the metallic spheres 1 to form an intermetallic compound. This simultaneously produces an advantageous anisotropy of the strength properties of the sintered, light-weight structural material which can advantageously be utilized in a large variety of applications.

Figure 2:
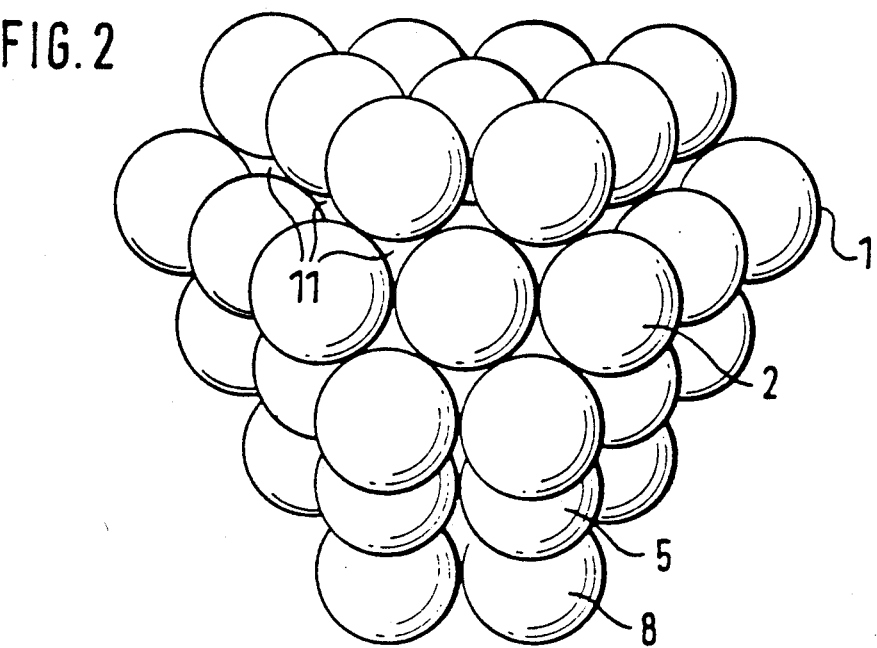
FIG. 2 illustrates a face-centered cubic, maximally dense sphere packing arrangement of metallic hollow spheres.

FIG. 2 illustrates a face-centered cubic, maximally dense sphere packing arrangement of metallic hollow spheres 1 arranged in packing sequence A,B,C, where the topmost layer 2 and the central layer 5 are arranged as shown in FIG. 1. The bottom-most layer 8 does not occupy the same recess positions as the uppermost layer 2, but instead fits in the second recesses of the uppermost layer 2 left empty by the central layer 5, so that a sintered light-weight structural material having lattice webs 11 is produced which possesses boosted mechanical strength in the cube diagonals.

FIG. 3 illustrates a preform having presintered metallic hollow spheres 1 in a nickel-base alloy. These nickel spheres 1 form a hexagonally maximally dense sphere packing arrangement and are interconnected by sintering at temperatures between about 800° C. and 1300° C. such that a porous, self-supporting stable preform 12 is produces which is suitable as a filter insert or a filler matrix for cooling gas wetted components, such as turbine blades.

FIG. 4 illustrates a presintered structure 13, with a filling 14 in the voids between the hollow spheres 1, consisting of hollow nickel spheres 22 having a diameter of about 5 mm and a shell thickness of 100 $\mu$ which are completely enveloped by aluminum-nickel alloy powder 15.

FIG. 5 illustrates a sintered, light-weight structural material having hexagonally stacked spherical voids 16 surrounded by a nickel-aluminum matrix 17, which is an intermetallic compound of about 68.5% by weight nickel and about 31.5% by weight aluminum.

FIG. 6 to 9 illustrate an embodiment of the method of the present invention. These Figures show a selective sectional view from a right parallelepiped 100×50×150 mm along the edges. The metallic hollow spheres 1 have a diameter of 5 mm±10% and a shell thickness of 100 $\mu$m+10%.

FIG. 6 illustrates three metallic hollow spheres 1 of nickel in a selective sectional view from a right parallelepiped comprising 973 hollow spheres which were agitated in a sintering mold having specifically prepared perforated inner surfaces for positioning the spheres to form a maximally dense sphere packing using a hexagonal ABA stacking sequence. After stacking, the sintering mold was presintered at about 1050° C., so that first sinter bridges 18 interconnect the metallic hollow spheres 1 to form a stable, self-supported preform.

FIG. 7 illustrates three metallic hollow spheres 1 in nickel of the self-supporting preform, which was taken from the sintering mold and placed in another sintering mold with smooth inner surfaces. In this sintering mold, the voids between the hollow nickel spheres are filled with elemental nickel and aluminum, where the aluminum-to-nickel ratio is selected such that when subsequently sintered, the filling and the material of the hollow spheres form the intermetallic compound NiAl$_3$.

FIG. 8 illustrates three metallic semispheres 1 in a selective sectional view from a right parallelepiped after having been reaction sintered at about 650° C. for about one hour under a high vacuum to form the intermetallic phase 21 NiAl$_3$. This reaction sintering step becomes necessary when elemental nickel and aluminum are added, and it is obviated when the intermetallic compound NiAl$_3$ is added in powdered form.

FIG. 9 illustrate three spherical voids 16 in a selective sectional view of a right parallelepiped in a sintered light-weight structural material 20. This sintered light-weight structural material essentially consists of the intermetallic phase NiAl, which has formed by sintering at about 1600° C. in a high vacuum for about one hour. Owing to its spherical voids, the sintered light-weight structural material has a specific density of about 2.43 g/cm$^3$ while the intermetallic compound NiAl has a density of about 5.85 g/cm$^3$.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A sintered metallic light-weight structural material, comprising a lattice structure of webs of intermetallic compounds forming equally spaced spherical voids which in turn are arranged in a maximally dense sphere packing configuration, the interstices between said spherical voids being completely filled with the intermetallic compounds.

2. A sintered metallic light-weight structural material of claim 1, wherein the spherical voids are about 0.4 to 5 mm in diameter.

3. A sintered metallic light-weight structural material of claim 1, wherein the webs are made of a sintered metal of at least about 95% of a theoretical density thereof.

4. A sintered metallic light-weight structural material of claim 1, wherein the hollow spheres have approximately a same spherical radius and;
wherein the hollow spheres form a regular, maximally dense sphere packing arrangement having at least one of a face centered and hexagonal sphere packing stacking sequence.

5. A sintered metallic light-weight structural material of claim 1, wherein the hollow spheres are made of one of a nickel and cobalt base metal.

6. A sintered metallic light-weight structural material of claim 1, wherein the powdered metal alloy is made of at least one of the elements titanium, niobium, vanadium, molybdenum, cobalt, chrome, nickel, aluminum and silicon, and of alloys and intermetallic compounds thereof.

7. A sintered metallic light-weight structural material of claim 1, wherein the powdered metal alloy is made of at least one of the elements nickel and aluminum and of an intermetallic compound thereof.

8. A sintered metallic light-weight structural material of claim 1, wherein the powdered metal alloy is an aluminum-nickel alloy of a composition such that a stochiometric quantitative proportion is maintained between nickel and aluminum, referred to the total material.

9. A method for manufacturing a sintered metallic light-weight structural material comprising the steps of:
   (a) stacking metallic hollow spheres to form a maximally dense sphere packing configuration,
   (b) presintering the metal spheres to form a presintered material,
   (c) completely filling the voids in the presintered material with one of powdered metals, metal alloys and intermetallic compounds adjusted in type and amount to suit the material of the metallic hollow spheres such that in subsequent sintering, intermetallic compounds result in the shape of webs between spherical voids, and
   (d) sintering the presintered material and the powder filling at a temperature permitting the formation of intermetallic compounds to form a sintered metallic light-weight structural material.

10. A method according to claim 9, wherein the hollow spheres have approximately a same spherical radius and;
wherein the hollow spheres form a regular, maximally dense sphere packing arrangement having at least one of a face centered and hexagonal sphere packing stacking sequence.

11. A method according to claim 9, wherein the hollow spheres are made of one of a nickel and cobalt base metal.

12. A method according to claim 9, wherein the metal spheres are presintered in a vacuum at temperatures ranging from about 800° C. to 1300° C.

13. A method according to claim 9, wherein the powdered metal alloy is made of at least one of the elements titanium, niobium, vanadium, molybdenum, cobalt, chrome, nickel, aluminum and silicon, and of alloys and intermetallic compounds thereof.

14. A method according to claim 9, wherein the powdered metal alloy is made of at least one of the elements nickel and aluminum and of an intermetallic compound thereof.

15. A method according to claim 9, wherein the powdered metal alloy is an aluminum-nickel alloy of a composition such that a stochiometric quantitative proportion is maintained between nickel and aluminum, referred to the total material.

* * * * *